United States Patent Office 2,891,053
Patented June 16, 1959

2,891,053
THERAPEUTICALLY VALUABLE CALCIUM SALTS

Friedrich-Johann Meyer and Wolfgang Wirth, Wuppertal-Elberfeld, Germany, assignors to Farbenfabriken Bayer Aktiengesellschaft, Leverkusen, Germany, a corporation of Germany No Drawing. Application December 20, 1956
Serial No. 629,758

Claims priority, application Germany December 20, 1955

3 Claims. (Cl. 260—211)

The present invention relates to therapeutically valuable calcium salts and more particularly to calcium salts of polyhydroxyalkylamino-N,N-di(alkylcarboxylic acids).

It has been found that calcium may be injected for therapeutical purposes particularly well in the form of its salts with polyhydroxyalkylamino-N,N-di(alkylcarboxylic acids). These salts form stable aqueous solutions which can be prepared in concentrations of for example up to 5 percent of calcium. These solutions are superior to the injectable calcium preparations hitherto introduced in therapy, in combining low toxicity with a high level of active calcium provision.

| | Ca-gluconate, 18 mg. Ca/ccm. | Ca-ethylene diamine tetra-acetic acid sodium salt | Amino-glycerol diacetic acid, Ca (20 mg/ccm.) Acc. to Ex. 1 |
|---|---|---|---|
| Toxicity, LD$_{50}$: | | | |
| Mouse, intravenous, g./kg. | 0.10 | 0.55 | 0.40 |
| Ca$^{++}$ effect on isolated frog heart according to Straub | ++ | — | ++ |
| Influence on the Ca$^{++}$ blood indication (precipitable as oxalate at physiological pH) of dog | ++ | — | ++ |

The aforesaid calcium salts are obtained by reacting polyhydroxyalkylamino-N,N-di(alkylcarboxylic acids) or their derivatives such as esters, amides, nitriles or salts with compounds yielding calcium ions, or by polyhydroxyalkylation of the calcium salts of imino-di(alkylcarboxylic acids).

As polyhydroxyalkyl amino-N,N-di(alkylcarboxylic acids) there may be considered for this purpose the di- or tri - hydroxyalkyl amino-N,N-di(alkyl-α-carboxylic acids) whose hydroxyl groups are in α-position to the secondary or tertiary carbon atom to which the amino group is linked. Polyhydroxyalkyl amino-N,N-di(alkylcarboxylic acids) are also particularly suitable which are prepared for example by carboxyalkylation of polyhydroxyalkyl amines or by polyhydroxyalkylation of imino-di(alkylcarboxylic acids). The alkyl groups in the polyhydroxy alkyl amino radical should have from 2–6 carbon atoms, while the alkyls of the alkylcarboxylic radicals have from 2–3 carbon atoms.

Examples of polyhydroxyalkyl amino-N,N-di(alkylcarboxylic acids) are 2-methyl-1,3-dihydroxypropyl-2-amino - N,N - diacetic acid, 2-hydroxymethyl-1,3-dihydroxyphenyl - 2 - amino-N,N-diacetic acid or 1,3-dihydroxypropyl - 2 - amino-N,N-bis-(α-butyric acid) and 2,3-dihydroxypropylamino-N,N-diacetic acid and glucamine-N,-diacetic acid. In addition to the free acids and their salts, their functional derivatives such as esters, amides or nitriles or their salts with organic or inorganic acids, for example oxalates, hydrochlorides or sulphates, may also be used for the preparation of the calcium salts, for instance by saponifying them in the presence of calcium ion-yielding agents.

Calcium carbonate, calcium oxide or calcium hydroxide may be used to advantage as calcium ion-yielding compounds for the reaction with free polyhydroxyalkyl amino-N,N-di(alkylcarboxylic acids). If the calcium salt is to be prepared from another salt such as an alkali metal or ammonium salt of a polyhydroxyalkylamino-N,N-di(alkylcarboxylic acid), a calcium salt such as the chloride or acetate is preferably used. The conversion of a polyhydroxyalkyl amino-N,-di(alkylcarboxylic acid) derivative such as an ester, amide or nitrile into the calcium salt is preferably carried out by saponification with the aid of calcium oxide or hydroxide. The polyhydroxyalkylation of the calcium salts of imino-di(alkylcarboxylic acids) may be effected for example by condensation with a hydroxy or polyhydroxyalkylepoxide, a polyhydroxyalkyl halogenide or a reactive ester of an aliphatic polyhydroxy alcohol.

The simplest hydroxyalkylepoxide, namely glycide, is very suitable for this reaction. It is also possible to use epoxides deriving from high molecular weight polyhydroxy alcohols such as tetritols, pentitols, hexitols, heptitols, their higher analogues or partial deshydroxy derivatives, if the latter contain at least three hydroxyl groups.

On the other hand, it is also possible to condense dihydroxy-, trihydroxy-, tetrahydroxy-, pentahydroxy-, hexahydroxy-alkylhalides as well as the corresponding reactive esters such as the mono-arylsulphonic acid ester of glycerol, tetritols, pentitols, hexitols, heptitols and their partial deshydroxy derivatives or higher analogues of these halides and esters, in a manner known as such with imino-dialkyl carboxylic acids or their derivatives, in the presence of acid-binding agents, to give polyhydroxyalkyl amino-di(alkyl carboxylic acids).

Finally, there may also be used for the polyhydroxyalkylation, in every case mentioned above, polyhydroxyalkyl derivatives whose hydroxyl groups are completely or partially protected, for example by acetal, ester or ether compounds. In these cases the condensation is followed by a hydrolysis of these compounds.

Imino-di(alkyl carboxylic acids) whose calcium salts may be considered for the reaction, include imino-diacetic acid, iminopropionic acids such as α,α'-imino dipropionic acid as a mixture of its optical isomers, as a racemate or mesoform, or also β,β'-iminodipropionic acid and higher homologues imino-di(alkylcarboxylic acids).

However, mixed imino-di(alkylcarboxylic acids) are also suitable for example alanine-N-acetic acid, imino-α-butyric acid acetic acid or imino-α-propionic acid-β-butyric acid.

The calcium salts of polyhydroxyalkylamino-N,N-di(alkylcarboxylic acids) are generally prepared in an aqueous solution. Such solutions may be used either directly for calcium therapy or for isolating the calcium salts. This isolation may be carried out for example by evaporation, or by precipitation with a water-miscible solvent such as a low molecular weight alcohol, acetone, dioxane or tetrahydrofurane. The calcium salts may be sterilized in an aqueous solution, for example by heating. It is often advantageous to add further substances to such solutions, in order either further to increase the calcium content or to stabilize concentrated solutions or to protect the solution from microbiological attacks during the preparation or to combine the calcium effect with another pharmacological effect.

Examples of such additional substances are complex-forming acids like nitrilo triacetic acid, gluconic acid, or ethylene diamine tetraacetic acid. Such stabilizers are added in an amount of 0.5–10 percent, a range of 3–6 percent being preferred for nitrilo triacetic acid and ethylene diamine tetraacetic acid, and 0.5 to 2 percent of gluconic acid.

The following examples are given for the purpose of illustrating the invention.

Example 1

150 grams of dihydroxy-propyl amino-N,N-diacetic acid (melting point 142° C. (decomposition)), 50 grams of calcium carbonate and 0.4 gram of p-hydroxy benzoic acid methylester are dissolved in 300 milliliters of twice distilled water, and the solution is made up to 400 milliliters. The solution thus obtained contains 5.13 grams of calcium per 100 milliliters and shows a pH value of 5.0. After dilution, for example to a calcium content of 2 grams per 100 milliliters, it may be charged into ampoules and sterilized by heating.

Example 2

150 grams of 2,3-dihydroxy propyl amino-N,N-diacetic acid are stirred with 56.25 grams of chalk and 300 milliliters of distilled water until the bulk of the chalk has dissolved (reaching 90° C. towards the end). The product is filtered and the solution precipitated by adding 1500 milliliters of alcohol with stirring. After drying the precipitate in vacuum at 100° C. a powder is obtained which is readily soluble in water and in which, according to analysis, approximately 3 calcium atoms are bound per 4 mols of 2,3-dihydroxypropyl amino-N,N-diacetic acid.

Analysis. — $3C_7H_{11}O_6NCa \cdot C_7H_{13}O_6 \cdot 2H_2O$: Calculated, C, 34.4; H, 5.12; N, 5.72; Ca, 12.05. Found, C, 34.37; H, 5.40; N, 5.32; Ca, 12.72.

Example 3

20 grams of 2,3-dihydroxy propylamino-N,N-diacetic acid are stirred with 10 grams of calcium oxide and 100 milliliters of distilled water at 25° C. for two hours and then at 90° C. for 30 minutes. Carbon dioxide is then introduced until the reaction is neutral, the product is filtered off with suction and precipitated with alcohol. After drying at 100° C., the calcium salt of 2,3-dihydroxy propyl amino-N,N-diacetic acid is obtained as a water-soluble powder.

Analysis.—$C_7H_{11}O_6NCa \cdot H_2O$: Calculated, C, 32.9; H, 4.94; N, 5.32; Ca, 15.2. Found, C, 32.81; H, 5.45; N, 5.26; Ca, 15.04.

Example 4

8.3 grams of iminodiacetic acid are suspended in 50 milliliters of water, the suspension is adjusted to pH value 10 with 2 N milk of lime (approx. 150 milliliters), and 20 grams of glycide are added with stirring. After standing at 25° C. for two days, with occasional shaking, the excess calcium-hydroxide is precipitated by the introduction of carbon dioxide at 90° C., the product is filtered and the solution concentrated by evaporation to 50 milliliters. The product is precipitated with 100 milliliters of alcohol, the precipitate filtered off with suction and dried at 100° C. under vacuum. The powder which is readily soluble in water contains according to analysis 3 atoms of calcium per 4 molecules of amino glycerol diacetic acid.

Analysis.—$3C_7H_{11}O_6NCa \cdot C_7H_{13}O_6N$: Calculated, C, 35.6; H, 4.88; N, 5.94; Ca, 12.7. Found, C, 35.51; H, 4.31; N, 6.00; Ca, 12.45.

Example 5

The process is carried out in the same way as in Example 4 but with the use of 15 milliliters of α-monochlorohydrin instead of glycide. At daily intervals 2 milliliter portions of milk of lime are added until a pH value of 10 is obtained. To remove the chlorine ions, the product has to be re-precipitated several times by dissolving in water and treating with alcohol. The readily water-soluble calcium salt of amino glycerodiacetic acid is thus obtained as a colourless powder.

$C_7H_{11}O_6NCa \cdot \frac{1}{2}H_2O$

Calculated: C, 33.1; H, 4.72; N, 5.52; Ca, 15.75. Found: C, 33.11; H, 4.66; N, 5.88; Ca, 15.6.

Example 6

A solution of glucamine is prepared by hydrating 50 grams of glucose in 300 milliliters of concentrated ammonia with 2.5 grams of Raney-nickel at 70–80° C. The solution is filtered and treated, after removal of the excess $NH_3$ under vacuum with 31.2 grams of 72 percent hydrocyanic acid. 85 grams of 30 percent formaldehyde are added dropwise at 0–10° C., the mixture is allowed to stand for 5 days, extracted with ether and the aqueous phase is heated with 20 grams of calcium oxide to 95° C. for several hours. The excess calcium hydroxide is then precipitated by the introduction of carbon dioxide, the product is filtered with animal charcoal and the almost colourless solution is precipitated with alcohol. After drying under vacuum at 100° C., the calcium salt of glucamine N,N-diacetic acid which is readily soluble in water is thus obtained in the form of an almost colourless powder.

$C_{10}H_{17}O_9NCa \cdot 2H_2O$

Calculated: C, 32.3; H, 5.66; N, 3.78; C, 10.7. Found: C, 32.22; H, 5.38; N, 3.56; C, 9.94.

Example 7

30 grams of imino diacetonitrile and 45 grams of glucose are hydrated in 400 milliliters of 98 percent methanol in the presence of Raney-nickel at 60–70° C. under pressure. After filtering off the catalyst with suction, a hot solution of 23 grams of oxalic acid in 150 milliliters of methanol is added, and the precipitate formed is filtered off with suction. After washing with methanol, the precipitate is dried in a desiccator and N,N-bis-cyanomethyl-glucamine oxalate is obtained as a weakly coloured powder of melting point 150° C. (darkening at 130° C.).

$C_{10}H_{17}O_5N_3 \cdot C_2H_2O_4 \cdot 2H_2O$

Calculated: C, 38.2; H, 5.98; N, 10.9. Found: C, 37.23; H, 5.98; N, 11.02.

16.8 grams of the oxalate are heated with 150 milliliters of 2 N milk of lime to 90° C. for three hours. After precipitating the excess calcium hydroxide by the introduction of carbon dioxide at 90° C., animal charcoal is added, the solution is concentrated under vacuum to 50 milliliters and precipitated with alcohol. The residue, which is isolated by decanting and dried under vacuum at 100° C., is the calcium salt of glucamine-N,N-diacetic acid.

$C_{10}H_{17}O_9NCa \cdot 2H_2O$

Calculated: C, 32.3; H, 5.66; N, 3.78; Ca, 10.79. Found: C, 32.88; H, 5.42; N, 3.70; Ca, 11.17.

Example 8

A mixture of 150 milliliters of water, 92 grams of 2,3-dihydroxy propylamino-N,N-diacetic acid, 6 grams of nitrilo triacetic acid and 1 gram of glucolactone are refluxed and 40 grams of calcium carbonate are slowly introduced in small portions. After refluxing for two hours the mixture is filtered from the undissolved matter, precipitated by introducing 4 parts by volume of ethanol. The syrupy precipitate is dried in vacuo at 60° C. The colourless product is easily soluble in water and has a calcium content of 12.75 percent.

Example 9

The procedure of Example 8 is repeated with the same amount of water, glucolactone and calcium carbonate with 94.5 grams of 2,3-dihydroxy propylamino-N,N-diacetic acid and 4.5 grams of ethylene diamine tetraacetic acid. An easily soluble product of a calcium content of 12.8 percent is obtained.

If 97 grams of 2,3-dihydroxy propylamino-N,N-diacetic acid and 3 grams of nitrilo triacetic acid are employed, an easily soluble product having a calcium content of 12.11 percent is obtained.

If instead of nitrilo triacetic acid 3 grams of ethylene diamine tetraacetic acid are employed, an easily soluble product, having a calcium content of 12.31 percent are obtained.

The broadest range of concentration of the aqueous injection solution is from 0.5–5 percent, calculated on the calcium content, while a range of 0.5–2.5 percent, calculated on the calcium content, is preferred.

The amino glycerol diacetic acid calcium salt and the glucamine N,N-diacetic acid calcium salt were tested clinically in a number of patients in concentrations of 10 milligrams of calcium per milliliter and 20 milligrams of calcium per milliliter.

The preparations were easily tolerated by all patients and showed no side effects, not even heat waves. They were intravenously injected. In general, the injection was carried out slowly (10 milliliters in three minutes). If occasionally the injections were carried out more quickly, no side effects were obtained. The preparations were generally given against allergic reactions, haemorrhages of different kinds, and in cases of latent tetany.

In various patients of the ages of 25 to 73 years such diseases as status asthmaticus, allergic reactions to various drugs such as diphenylbutyl-1,3-dioxopyrazolidine, various X-ray contrast agents, further latent tetany and others, the products of the present invention were given successfully with complete disappearance of the irritation.

We claim:

1. A calcium salt of a polyhydroxy alkyl amino-N,N-di(alkyl carboxylic acid), containing from 2 to 5 hydroxy groups, in which the alkyl group attached to the amine radical has from 3 to 6 carbon atoms and in which the alkyl group attached to the carboxylic acid radical has from 2 to 3 carbon atoms.
2. The calcium salt of aminoglyceroldiacetic acid.
3. The calcium salt of glucamine-N,N-diacetic acid.

References Cited in the file of this patent
UNITED STATES PATENTS 2,097,864   Platz et al. _____ Nov. 2, 1937